(12) United States Patent
Wheeler

(10) Patent No.: US 11,369,085 B2
(45) Date of Patent: Jun. 28, 2022

(54) ANIMAL FECES COLLECTION ASSEMBLY

(71) Applicant: William Wheeler, Lincoln, CA (US)

(72) Inventor: William Wheeler, Lincoln, CA (US)

( * ) Notice: Subject to any disclaimer, the term of this patent is extended or adjusted under 35 U.S.C. 154(b) by 46 days.

(21) Appl. No.: 17/008,995

(22) Filed: Sep. 1, 2020

(65) Prior Publication Data
US 2022/0061270 A1    Mar. 3, 2022

(51) Int. Cl.
A01K 23/00 (2006.01)
E01H 1/12 (2006.01)

(52) U.S. Cl.
CPC ......... *A01K 23/005* (2013.01); *E01H 1/1206* (2013.01)

(58) Field of Classification Search
CPC .................... A01K 23/005; E01H 1/1206
See application file for complete search history.

(56) References Cited

U.S. PATENT DOCUMENTS

| 4,852,924 | A | 8/1989 | Ines | |
| 5,683,129 | A | 11/1997 | Jensen | |
| 5,718,469 | A * | 2/1998 | Ockerman | A01K 23/005 248/101 |
| 5,971,452 | A | 10/1999 | Marymor | |
| 6,149,214 | A * | 11/2000 | Kipka | A01K 23/005 294/1.5 |
| 6,386,606 | B1 | 5/2002 | Marshall | |
| 6,702,349 | B2 | 3/2004 | Clements | |
| 7,090,268 | B2 | 8/2006 | Borman | |
| 9,456,585 | B1 * | 10/2016 | Kao | A01K 23/005 |
| 9,668,457 | B1 * | 6/2017 | Irons | A01K 23/005 |
| D811,023 | S | 2/2018 | Baker | |
| 10,465,351 | B1 | 11/2019 | Perez | |
| 2007/0222240 | A1 | 9/2007 | Sherman | |
| 2009/0102212 | A1 | 4/2009 | Casper | |
| 2016/0165847 | A1 * | 6/2016 | Huang | A01K 23/005 294/1.5 |

* cited by examiner

Primary Examiner — Stephen A Vu

(57) ABSTRACT

An animal feces collection assembly for holding a plastic bag open for receiving animal feces includes a holder that has a stem portion and a ring portion. The stem portion can be gripped by a user and the ring portion can have a plastic bag positioned therearound. The ring portion has a groove integrated therein. A gasket is positionable around the ring portion such that the gasket is positioned in the groove. In this way the gasket compresses the plastic bag into the groove to retain the plastic bag on the ring portion.

4 Claims, 5 Drawing Sheets

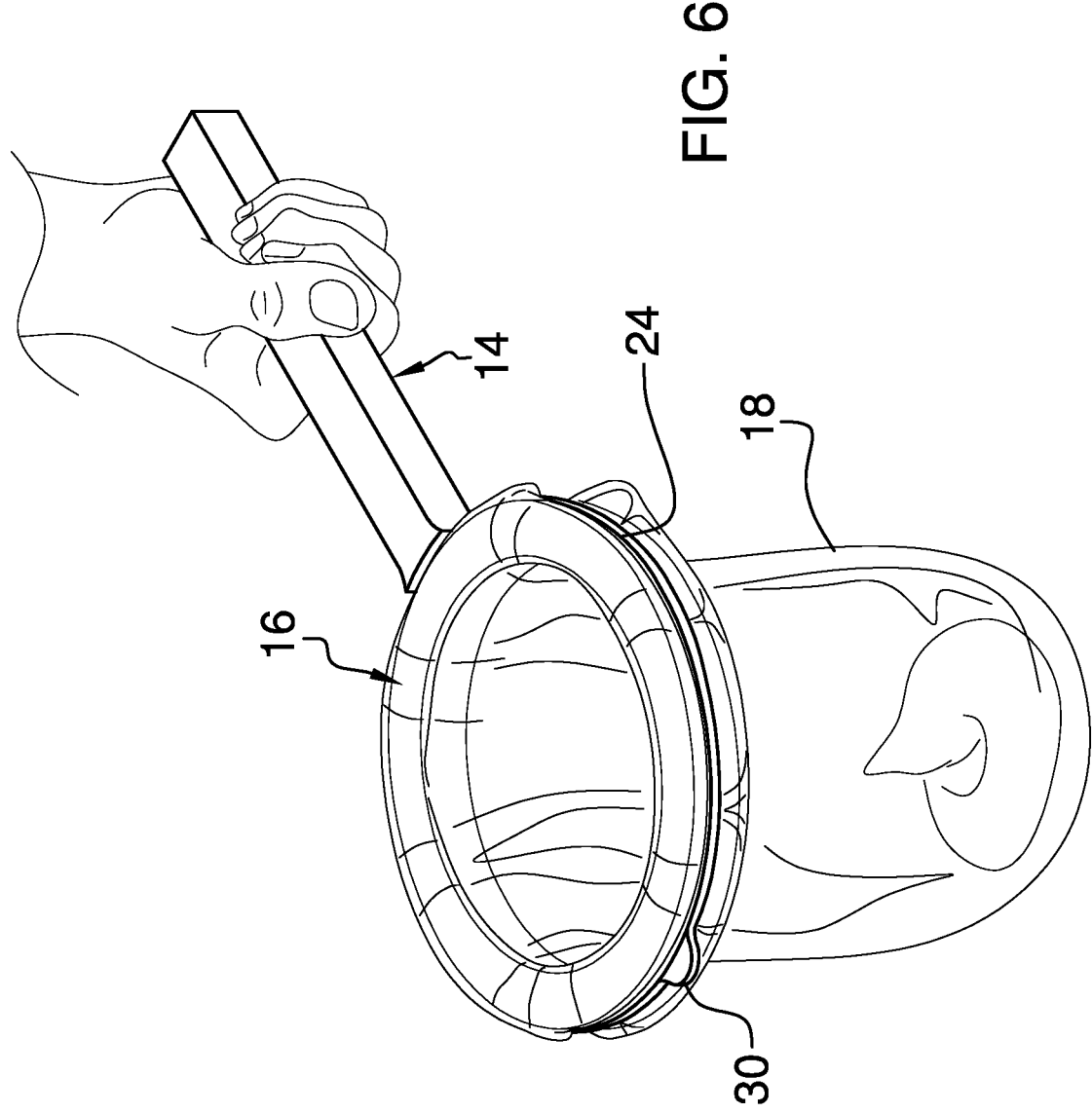

ANIMAL FECES COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feces collection devices and more particularly pertains to a new feces collection device for holding a plastic bag open for receiving animal feces.

(2) Description of Related Art Including Information Disclosed Under 37 CFR 1.97 and 1.98

The prior art relates to feces collection devices including a variety of bag holders that includes a closed ring and a handle that is movably coupled to the closed ring. The prior art also discloses a variety of bag holders that include a closed ring and a handle that angles upwardly from the closed ring. The prior art also discloses a bag holder that includes a closed ring and a handle that extends laterally away from the closed ring. The prior art discloses a bag holder that includes a closed ring with a groove therein and a retainer that is positioned in the groove for engaging plastic bag.

BRIEF SUMMARY OF THE INVENTION

An embodiment of the disclosure meets the needs presented above by generally comprising a holder that has a stem portion and a ring portion. The stem portion can be gripped by a user and the ring portion can have a plastic bag positioned therearound. The ring portion has a groove integrated therein. A gasket is positionable around the ring portion such that the gasket is positioned in the groove. In this way the gasket compresses the plastic bag into the groove to retain the plastic bag on the ring portion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a perspective in-use view of an embodiment of the disclosure.

DETAILED DESCRIPTION OF THE INVENTION

Figure 1:
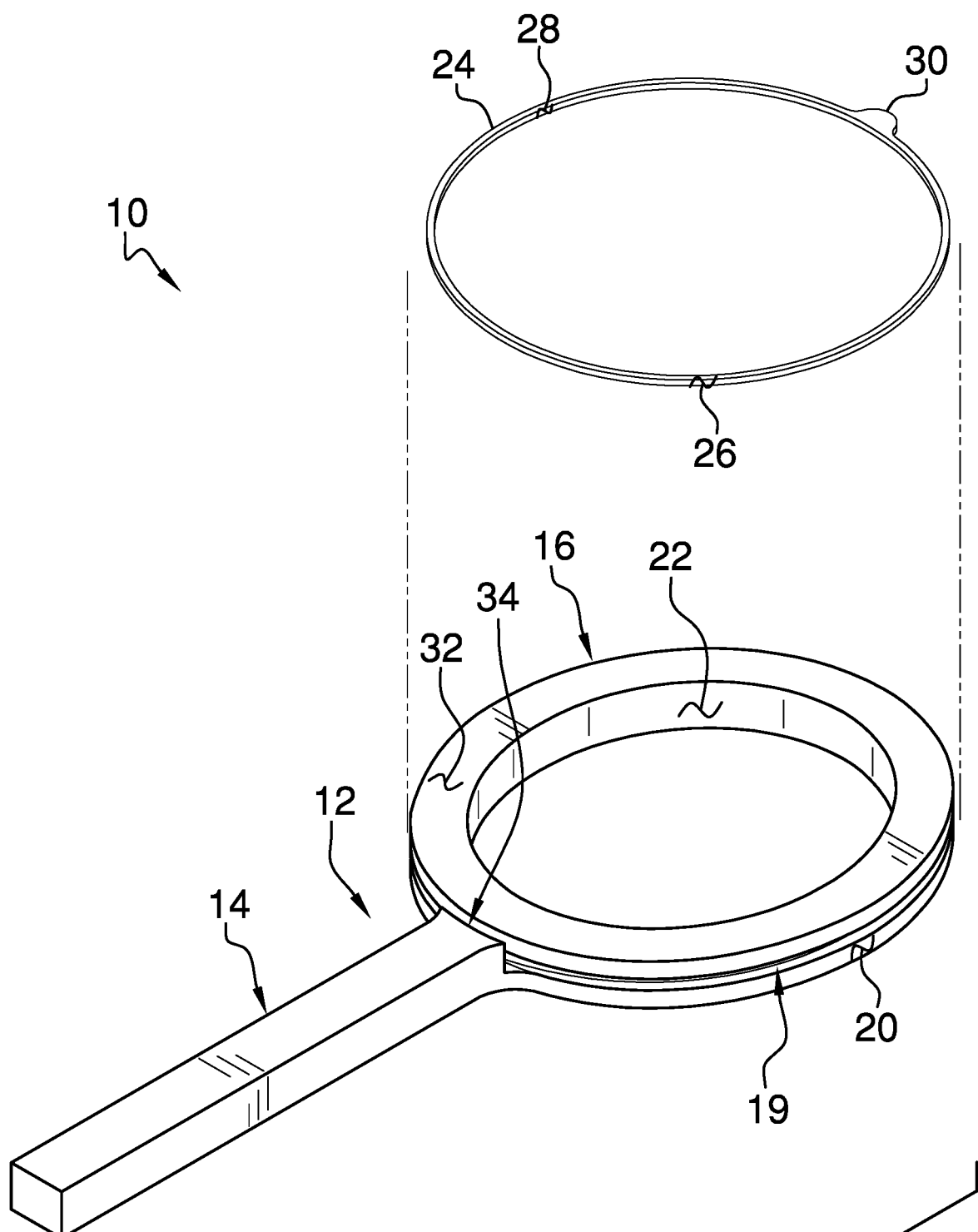
FIG. 1 is a top perspective view of an animal feces collection assembly according to an embodiment of the disclosure.
Figure 2:
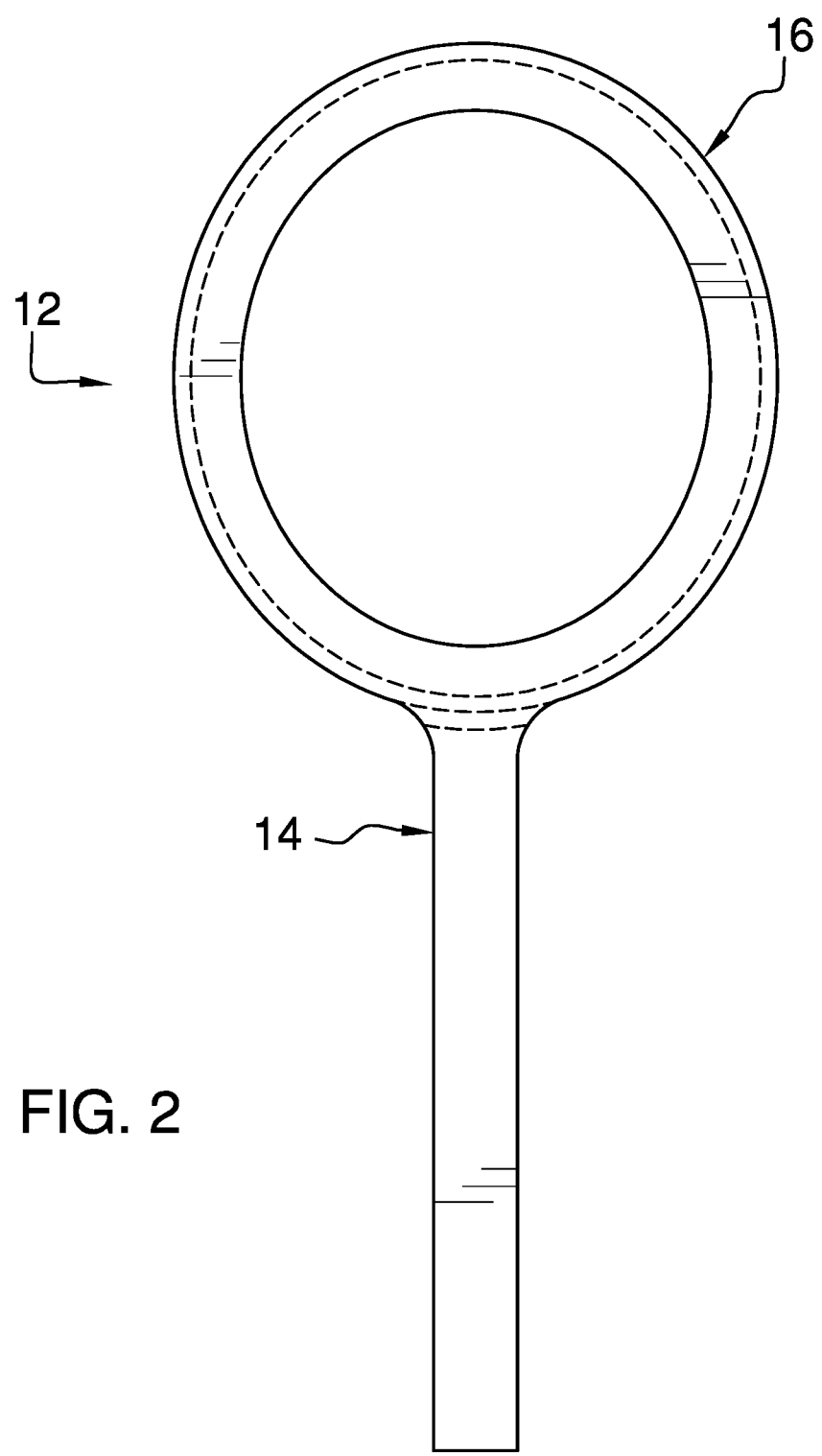
FIG. 2 is a bottom phantom view of a holder of an embodiment of the disclosure.
Figure 3:
FIG. 3 is a front view of a holder of an embodiment of the disclosure.
Figure 4:
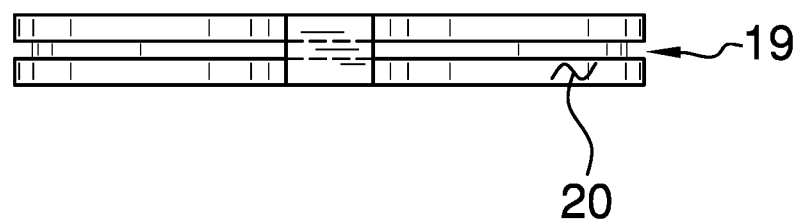
FIG. 4 is a back view of a holder of an embodiment of the disclosure.
Figure 5:
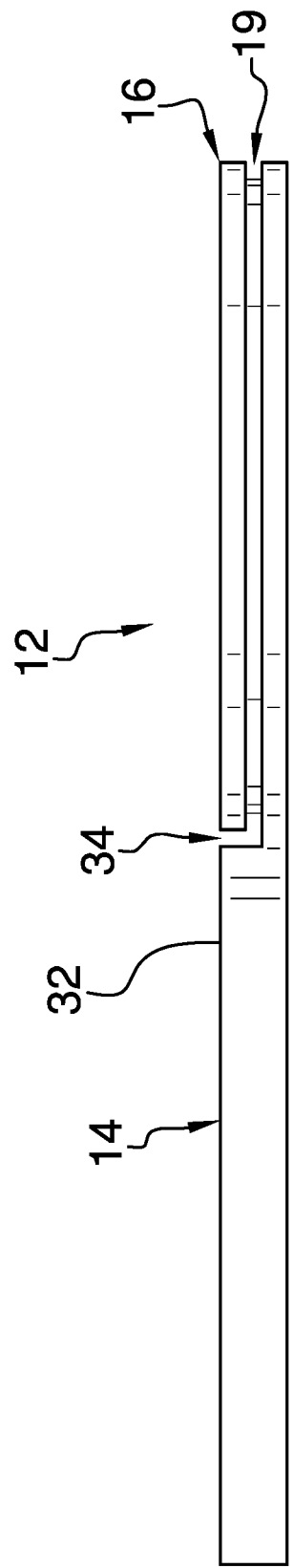
FIG. 5 is a right side view of a holder of an embodiment of the disclosure.

With reference now to the drawings, and in particular to FIGS. 1 through 6 thereof, a new feces collection device embodying the principles and concepts of an embodiment of the disclosure and generally designated by the reference numeral 10 will be described.

As best illustrated in FIGS. 1 through 6, the animal feces collection assembly 10 generally comprises a holder 12 that has a stem portion 14 and a ring portion 16. The stem portion 14 can be gripped by a user and the ring portion 16 can have a plastic bag 18 positioned therearound. Additionally, the plastic bag 18 is positioned to extend downwardly from the ring portion 16 thereby facilitating the plastic bag 18 to receive animal feces. Additionally, a groove 19 is integrated into the ring portion 16.

The ring portion 16 has an outwardly facing surface 20 and an inwardly facing surface 22. Each of the inwardly facing surface 22 and the outwardly facing surface 20 is continuously arcuate about a center point of the ring portion 16 such that the ring portion 16 forms a closed loop. The stem portion 14 extends away from the outwardly facing surface 20 and the groove 19 extends inwardly on the outwardly facing surface 20 toward the inwardly facing surface 22. Moreover, the groove 19 extends around a full circumference of the outwardly facing surface 20.

A gasket 24 is provided and the gasket 24 is positionable around the ring portion 16 such that the gasket 24 is positioned in the groove 19. In this way the gasket 24 can compress the plastic bag 18 into the groove 19 for retaining the plastic bag 18 on the ring portion 16. The gasket 24 has a first surface 26 and a second surface 28 that is each continuously arcuate about a center point of the gasket 24 such that the gasket 24 forms a closed loop. The first surface 26 engages the groove 19 when the gasket 24 is positioned around the ring portion 16. The second surface 28 has a lobe 30 extending outwardly therefrom that can be gripped for positioning the gasket 24 around the ring portion 16. The gasket 24 may be comprised of a resiliently stretchable material such as rubber or the like to ease placing the gasket 24 around the ring portion 16.

The holder 12 has top surface 32 and the top surface 32 has a slot 34 extending downwardly therein. Additionally, the slot 34 is aligned with an intersection between the stem portion 14 and the ring portion 16. The slot 34 intersects the groove 19 such that the slot 34 accommodates the gasket 24 when the gasket 24 is positioned around the ring portion 16.

In use, the plastic bag 18 is positioned to extend through the ring portion 16 and the plastic bag 18 is wrapped around the outwardly facing surface 20 of the ring portion 16. The gasket 24 is positioned around the ring portion 16 to retain the plastic bag 18 on the ring portion 16. In this way the plastic bag 18 is held open for receiving animal feces. Additionally, the stem portion 14 is gripped by a user while the user is depositing the animal feces in the plastic bag 18. In this way the plastic bag 18 is held open without requiring the user to touch the plastic bag 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal feces collection assembly for holding a bag in an open position for receiving animal feces, said assembly comprising:

a holder having a stem portion and a ring portion wherein said stem portion is configured to be gripped by a user and said ring portion is configured to have a plastic bag positioned therearound, said ring portion having a groove being integrated therein, wherein said ring has an outwardly facing surface and an inwardly facing surface, each of said inwardly facing surface and said outwardly facing surface being continuously arcuate about a center point of said ring portion such that said ring portion forms a closed loop, said stem extending away from said outwardly facing surface, wherein said groove extends inwardly on said outwardly facing surface toward said inwardly facing surface, said groove extending around a full circumference of said outwardly facing surface;

a gasket being positionable around said ring portion such that said gasket is positioned in said groove wherein said gasket is configured to compress the plastic bag into said groove to retain the plastic bag on said ring portion; and wherein said holder has top surface, said top surface having a slot extending downwardly therein, said slot being aligned with an intersection between said stem portion and said ring portion, said slot intersecting said groove such that said slot accommodates said gasket when said gasket is positioned around said ring portion.

2. An animal feces collection assembly for holding a bag in an open position for receiving animal feces, said assembly comprising:

a holder having a stem portion and a ring portion wherein said stem portion is configured to be gripped by a user and said ring portion is configured to have a plastic bag positioned therearound, said ring portion having a groove being integrated therein, wherein said ring has an outwardly facing surface and an inwardly facing surface, each of said inwardly facing surface and said outwardly facing surface being continuously arcuate about a center point of said ring portion such that said ring portion forms a closed loop, said stem extending away from said outwardly facing surface, wherein said groove extends inwardly on said outwardly facing surface toward said inwardly facing surface, said groove extending around a full circumference of said outwardly facing surface;

a gasket being positionable around said ring portion such that said gasket is positioned in said groove wherein said gasket is configured to compress the plastic bag into said groove to retain the plastic bag on said ring portion; and wherein said gasket has a first surface and a second surface each being continuously arcuate about a center point of said gasket such that said gasket forms a closed loop, said first surface engaging said groove when said gasket is positioned around said ring portion.

3. The assembly according to claim 2, wherein said second surface has a lobe extending outwardly therefrom wherein said lobe is configured to be gripped for positioning said gasket around said ring portion.

4. An animal feces collection assembly for holding a bag in an open position for receiving animal feces, said assembly comprising:

a holder having a stem portion and a ring portion wherein said stem portion is configured to be gripped by a user and said ring portion is configured to have a plastic bag positioned therearound, said ring portion having a groove being integrated therein, said ring having an outwardly facing surface and an inwardly facing surface, each of said inwardly facing surface and said outwardly facing surface being continuously arcuate about a center point of said ring portion such that said ring portion forms a closed loop, said stem extending away from said outwardly facing surface, said groove extending inwardly on said outwardly facing surface toward said inwardly facing surface, said groove extending around a full circumference of said outwardly facing surface; and a gasket being positionable around said ring portion such that said gasket is positioned in said groove wherein said gasket is configured to compress the plastic bag into said groove to retain the plastic bag on said ring portion, said gasket having a first surface and a second surface each being continuously arcuate about a center point of said gasket such that said gasket forms a closed loop, said first surface engaging said groove when said gasket is positioned around said ring portion, said second surface having a lobe extending outwardly therefrom wherein said lobe is configured to be gripped for positioning said gasket around said ring portion, said holder having top surface, said top surface having a slot extending downwardly therein, said slot being aligned with an intersection between said stem portion and said ring portion, said slot intersecting said groove such that said slot accommodates said gasket when said gasket is positioned around said ring portion.

* * * * *